UNITED STATES PATENT OFFICE.

HENRY SPENCER BLACKMORE, OF MOUNT VERNON, NEW YORK.

PROCESS OF GENERATING ACETYLENE GAS.

SPECIFICATION forming part of Letters Patent No. 682,521, dated September 10, 1901.

Application filed September 17, 1896. Renewed January 19, 1901. Serial No. 43,952. (No specimens.)

*To all whom it may concern:*

Be it known that I, HENRY SPENCER BLACKMORE, a citizen of the United States, and a resident of the city of Mount Vernon, in the county of Westchester and State of New York, have invented a new and useful Improvement in Processes of Producing Hydrogen Carbids, of which the following is a specification.

The object of my invention is to produce hydrogen carbids, such as acetylene gas, by chemical means and in such a manner as to economize the cost of production as found hitherto; and it consists in bringing a gaseous hydrogen acid, preferably hydrogen sulfid, in contact with iron carbid in a heated state, and preferably in an atmoshere of hydrogen gas.

In carrying out my invention on a practical basis I proceed as follows: I take iron carbid, break the same in small pieces, place it in a retort, and heat it to a bright red. I then pass through the retort a stream of hydrogen-sulfid gas, together with a small portion of free hydrogen, whereby the hydrogen sulfid is dissociated by the heated iron carbid, producing iron sulfid and generating acetylene. The object of the free hydrogen is to prevent dissociation of the acetylene produced at the high temperature employed. The reaction which takes place may be illustrated by the following chemical formula or equation:

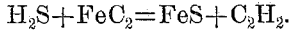

After all the iron carbid is transformed into iron sulfid the hydrogen-sulfid gas is cut off and superheated steam introduced. This decomposes the iron sulfid, producing hydrogen sulfid and free hydrogen and iron oxid. The hydrogen sulfid thus produced can be employed in further conversion into acetylene. The reaction taking place can be illustrated by the following chemical formula or equation:

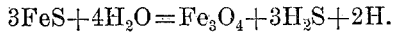

The iron oxid thus produced is mixed with coal-tar and heated in a retort having a vent for the escape of gaseous by-products. The tar or carbonaceous matter thus reduces the iron oxid to metallic state, and to its intimate contact with the carbonaceous matter becomes converted into iron carbid, which after cooling is removed from the retort and broken in small pieces. It can therefore be readily seen that the process can thus be carried on practically in a continuous manner, the sulfur being transferred from the hydrogen to the iron of the carbid with a production of iron sulfid, acetylene, and from hydrogen gases and the sulfur again united with hydrogen for future operation by action of superheated steam on the iron sulfid and finally the iron oxid thus produced transformed into carbid by heating with carbonaceous matter. The various reactions may be illustrated thus:

Production of acetylene:

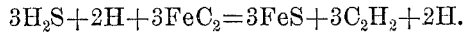

Production of hydrogen sulfid:

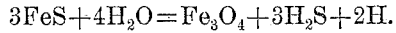

Production of iron carbid:

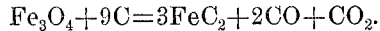

If hydrogen sulfid is introduced into the retort containing iron carbid without any appreciable amount of free hydrogen, much of the acetylene will be dissociated into other carbids, such as ethylene, ($C_2H_4$,) di-acetylene, ($C_4H_4$,) ethane, ($C_2H_6$,) &c. Any hydrogen sulfid contaminating the hydrogen carbid produced can be readily removed by treatment with lime and ferric hydroxid in a manner commonly employed for its removal from coal-gas. By passing the gas through a series of retorts containing iron carbid in a heated state, however, nearly all of the hydrogen sulfid will be transformed into hydrogen carbid. While other hydrogen compounds of herein-described acid nature in gaseous state might be employed under certain conditions without departing from the spirit of my invention, still I have found iron carbid and hydrogen sulfid the most practical and economical, it being noted that the term "hydrogen acid" employed herein relates to a compound which need not have actual physical acid properties, but, like acid, the hydrogen of which is displaced by the base of the extraneously-heated metallic carbid by virtue of the greater affinity of the acid or negative constituent of the compound for said carbid base and simultaneous affinity of the hydrogen for the carbon of the carbid producing hydrogen carbid.

The words "metallic carbid" used throughout this specification and claims has reference to compounds of a metal or base with carbon of any atomicity, be it a normal carbid or acetylid, and the word "gaseous" also to a dry aeriform condition, as would be produced by vaporizing the transforming reagent employed with heat, as well as gas *per se*. The term "dry" as employed herein relates to the absence of water in its moist or wetting condition, above which in contact with carbid it has no chemically-heating powers, and the term "extraneously heated" as employed herein relates to a heated condition produced by means of a foreign agency, but relates in no manner to heat liberated by chemical reaction of the reagent with the carbids or their products.

Having now described my invention, what I claim as new, and desire to secure by Letters Patent, is—

1. The process of producing hydrogen carbids which consists in performing a double reaction between an extraneously-heated carbid and a dry hydrogen acid the hydrogen of which has greater affinity for the carbon of the carbid than it has for the acid constituent with which it is combined in the presence of said carbid.

2. The process of producing hydrogen carbids which consists in subjecting metallic carbid to the action of hydrogen sulfid or its described equivalent, and simultaneously heating the mixture by extraneous heat.

3. The process of producing hydrogen carbids which consists in subjecting an extraneously-heated metallic carbid to the actions of an acid gas or its described equivalent.

In testimony that I claim the foregoing as my invention I have signed my name, in presence of two witnesses, this 20th day of July, 1896.

HENRY SPENCER BLACKMORE. [L. S.]

Witnesses:
CHAS. A. SCHENCK,
JAMES W. RICH.